United States Patent
Sun et al.

(10) Patent No.: US 12,142,996 B2
(45) Date of Patent: Nov. 12, 2024

(54) TUBULAR MOTOR ASSEMBLY USING CORELESS MOTOR STRUCTURE

(71) Applicant: HANGZHOU WISTAR MECHANICAL & ELECTRIC TECHNOLOGY CO., LTD, Zhejiang (CN)

(72) Inventors: Xudong Sun, Zhejiang (CN); Cailong Zhu, Zhejiang (CN)

(73) Assignee: HANGZHOU WISTAR MECHANICAL & ELECTRIC TECHNOLOGY CO., LTD, Zhejiang (CN)

( * ) Notice: Subject to any disclaimer, the term of this patent is extended or adjusted under 35 U.S.C. 154(b) by 453 days.

(21) Appl. No.: 17/615,030

(22) PCT Filed: May 14, 2020

(86) PCT No.: PCT/CN2020/090371
§ 371 (c)(1),
(2) Date: Nov. 29, 2021

(87) PCT Pub. No.: WO2020/238644
PCT Pub. Date: Dec. 3, 2020

(65) Prior Publication Data
US 2022/0231575 A1    Jul. 21, 2022

(30) Foreign Application Priority Data
May 31, 2019    (CN) .......................... 201910467562.X

(51) Int. Cl.
*H02K 7/116*    (2006.01)
*H02K 7/102*    (2006.01)
(Continued)

(52) U.S. Cl.
CPC ............. *H02K 7/116* (2013.01); *H02K 7/102* (2013.01); *H02K 11/0094* (2013.01); *H02K 11/33* (2016.01); *H02K 2207/03* (2013.01)

(58) Field of Classification Search
CPC .... H02K 7/116; H02K 11/33; H02K 11/0094; H02K 2207/03
See application file for complete search history.

(56) References Cited

U.S. PATENT DOCUMENTS 8,004,132 B2 *    8/2011    Fukuoka ................ H02K 7/116
                                                             310/83
11,873,882 B2 *   1/2024    Sun ......................... F16H 57/10
(Continued)

FOREIGN PATENT DOCUMENTS

CN    201118357    9/2008
CN    203504350    3/2014
(Continued)

OTHER PUBLICATIONS

International Search Report, issued in the corresponding PCT application No. PCT/CN2020/090371, dated Aug. 12, 2020, 8 pages.

*Primary Examiner* — Forrest M Phillips
(74) *Attorney, Agent, or Firm* — HSML P.C.

(57) ABSTRACT

A tubular motor assembly using a coreless motor structure is provided includes: a steel tube body and a coreless motor, wherein one end of a motor main body is inserted at one end of a battery circuit board housing; a control circuit board and/or a power supply battery is provided within the battery circuit board housing; the other end of the motor main body is connected to a primary gear ring; a motor shaft of the motor main body is connected to a primary planetary gear assembly; the other end of the primary gear assembly is connected to a secondary/tertiary gear ring through a brake outer sleeve; the primary planetary gear assembly is con-
(Continued)

nected to a secondary planetary gear assembly through a brake structure; and a tertiary planetary gear assembly is connected to an output shaft.

10 Claims, 14 Drawing Sheets

(51) Int. Cl.
*H02K 11/00* (2016.01)
*H02K 11/33* (2016.01)

(56) References Cited

U.S. PATENT DOCUMENTS

2009/0289514 A1* 11/2009 Fukuoka ................ H02K 7/116
  310/83
2019/0319507 A1* 10/2019 Shiraki ................... H02K 9/04

FOREIGN PATENT DOCUMENTS

| | | |
|---|---|---|
| CN | 107800247 | 3/2018 |
| CN | 208353129 | 1/2019 |
| CN | 109713844 | 5/2019 |
| CN | 110233546 | 9/2019 |
| CN | 209982275 | 1/2020 |
| JP | 09-191621 | 7/1997 |

* cited by examiner

TUBULAR MOTOR ASSEMBLY USING CORELESS MOTOR STRUCTURE

TECHNICAL FIELD OF THE INVENTION

The present invention belongs to the technical field of motor devices, and particularly relates to a tubular motor assembly using a coreless motor structure.

BACKGROUND OF THE INVENTION

With the rapid development of the mechanical and electrical industry, motors have been widely used in people's life at present. For example, as driving devices, tubular motors have the advantages of compact structure, large torque, low rotating speed and the like, so the tubular motors are increasingly used in products that use motors to realize lifting motion, such as roller shutters, sun shading systems and projection screens. Since the motor shafts of the tubular motors are too high in rotating speed, for ease of use, speed reducers are generally provided on the tubular motors, so that the rotating speed of the output shafts satisfies the requirements for normal use. Existing DC tubular motors are generally ordinary rare-earth or ferrite motors, that is, they have the structural characteristic that rotor cores and magnetic shoes are attached to the housing. The existing tubular rare-earth or ferrite motors have many deficiencies. For example, firstly, due to the large mass of the rotor cores, the rotors have slow response, high energy consumption and large vibration, resulting in a serious damage to components and limiting the service life of the whole machine. Then, the rotor cores will produce an eddy current in the magnetic field, resulting in motor heating, high energy consumption and low efficiency. Secondly, since the magnetic shoes (permanent magnets) are fixed on the housing, the magnetic shoes (permanent magnets) must have a certain thickness. When the outer diameter of the motors is given, the outer diameter of the motor rotors will be greatly limited, and the output torque of the motors is thus greatly limited. In addition, the speed reducers of the existing tubular motors cannot satisfy the requirements in term of the speed reduction ratio and are not compact enough in structure and poor in stability during the transmission process. These problems have caused great inconvenience to the existing tubular motors when in use.

In order to solve the deficiencies in the prior art, long-term exploration has been conducted, and a variety of solutions have been proposed. For example, Chinese Patent Document disclosed a planetary reducer of a tubular motor [200720184522.7], including a sun gear, an inner toothed end cover, an inner toothed sleeve and an inner toothed sleeve seat, wherein the planetary reducer is internally provided with: a primary support main body, on which three support pins are provided, primary planetary gears being provided on the support pins, gears being provided at lower ends of the primary planetary gears; a secondary support main body, on which three support pins being provided on the secondary support main body, secondary planetary gears being provided on the support pins, gears being provided at lower ends of the support pins; and, a tertiary support main body, on which three support pins are provided, tertiary planetary gears being provided on the support pins, output shafts being provided at lower ends of the support pins. Although the above solution solves the problem that the speed reducers of the existing tubular motors cannot satisfy the requirements in terms of the speed reduction ratio to a certain extent, this solution still has many deficiencies of ordinary rare-earth or ferrite motor. Meanwhile, this solution still has other deficiencies such as poor transmission stability.

SUMMARY OF THE INVENTION

In view of the above problems, an objective of the present invention is to provide a tubular motor assembly using a coreless motor structure, which has rational structure and uses a coreless motor structure.

In order to achieve the above objective, the present invention employs the following technical solutions. A tubular motor assembly using a coreless motor structure is provided, including a hollow steel tube body, a motor main body being internally provided in the steel tube body, wherein the motor main body is a coreless motor, and one end of the motor main body is inserted at one end of a battery circuit board housing; a control circuit board and/or a power supply battery which is connected to the motor main body and has a control circuit is provided within the battery circuit board housing through a battery circuit board positioning structure; the other end of the motor main body is connected to one end of a primary gear ring through a motor connecting seat, and a motor shaft of the motor main body is connected to a primary planetary gear assembly provided within the primary gear ring; the other end of the primary gear ring is connected to a secondary/tertiary gear ring having a secondary planetary gear assembly and a tertiary gear ring connected to each other through a brake outer sleeve; the primary planetary gear assembly is connected to the secondary planetary gear assembly through a brake structure located in the brake outer sleeve; the tertiary planetary gear assembly is connected to an output shaft which extends to the outer side of one end of the steel tube body; and, the other end of the steel tube body away from the output shaft is connected to a cover body through a limiting ring.

In the tubular motor assembly using a coreless motor structure, the battery circuit board positioning structure includes a circuit board mounting region and a battery mounting region successively formed within the battery circuit board housing; a mounting opening which extends in the axial direction of the battery circuit board housing and is respectively communicated with the circuit board mounting region and the battery mounting region is formed on the outer circumferential side of the battery circuit board housing; the control circuit board is provided within the circuit board mounting region through a first positioning structure; and, the power supply battery is provided within the battery mounting region through a second positioning structure.

In the tubular motor assembly using a coreless motor structure, the battery circuit board housing includes a cylindrical motor mounting drum; the motor mounting drum is coaxially connected to a battery circuit board mounting drum; the circuit board mounting region and the battery mounting region are successively formed within the battery circuit board mounting drum; the mounting opening is axially provided on the outer circumferential side of the battery circuit board mounting drum; one end of the motor main body is inserted into the motor mounting drum; the motor mounting drum and the battery circuit board mounting drum are separated from each other through a closure plate; a number of through holes for allowing terminals at one end of the motor main body to be inserted therein are formed on the closure plate; the terminals of the motor main body are connected to the control circuit board, respectively; mounting plates which go beyond the mounting opening and extend in the axial direction of the battery circuit board mounting drum are provided on two sides of the mounting opening, respectively; the mounting plates are parallel to each other; and, one end of each of the mounting plates is connected to the closure plate, while the other end thereof extends to an end of the battery circuit board mounting drum.

Preferably, herein, the first positioning structure includes positioning steps provided on bottoms of opposite sides of the mounting plates; two sides of the control circuit board are clamped between the two mounting plates, and the inner side of the control circuit board is resisted against the positioning steps; and, a battery circuit board upper housing which can seal the part of the mounting opening corresponding to the control circuit board and is shaped as an arc-shaped plate is provided on the battery circuit board mounting drum through a detachable assembly. The detachable assembly includes a number of snaps or necks provided on the outer sides of the mounting plates, respectively; a number of necks or snaps are provided on two sides of the battery circuit board upper housing, respectively; the snaps are clamped into the necks; and, the battery circuit board upper housing and the battery circuit board mounting drum are encircled to form a cylindrical structure. The second positioning structure includes a partition plate which is provided between the two mounting plates and partitions the inner cavity of the battery circuit board housing into the circuit board mounting region and the battery mounting region; a battery limiting portion connected to the mounting plates is provided at one end of the battery circuit board mounting drum away from the circuit board mounting region; the power supply battery is rod-shaped and clamped between the partition plate and the battery limiting portion; and, the outer side of the power supply battery goes beyond the mounting opening. The motor mounting drum and the battery circuit board mounting drum are connected to form an integral structure, the outer side of the motor mounting drum is flush with the outer side of the battery circuit board upper housing, and the outer side of the power supply battery does not go beyond the outer side of the motor mounting drum.

In the tubular motor assembly using a coreless motor structure, the brake structure includes a brake mandrel which is provided within the brake outer sleeve through a circumferential positioning structure; a cylindrical brake drum is provided at one end of the brake mandrel, and a brake torsion spring is sleeved on the brake drum; a brake driving member and a brake driven member arranged coaxially are internally provided in the brake outer sleeve; the brake driving member is connected to an output end of the primary planetary gear assembly, and the brake driven member is connected to an input end of the secondary planetary gear assembly; the brake driving member is provided with two driving jaws, and one end of the brake driven member close to the brake driving member passes through the brake mandrel and is provided with two driven jaws; the driving jaws and the driven jaws are staggered one by one, and any one of the driving jaws is located on one side of any one of the driven jaws; and, a brake control assembly, which enables the brake torsion spring to expand in the circumferential direction and the brake driven member to rotate synchronously with the brake driving member in the same direction when the brake driving member rotates in the circumferential direction or enables the brake torsion spring to contract in the circumferential direction and the brake driven member to stop in the circumferential direction when the brake driven member rotates in the circumferential direction, is provided between the driving jaws and the driven jaws.

In the tubular motor assembly using a coreless motor structure, the brake control structure includes bent legs which are formed at two ends of the brake torsion springs and bent outward in the radial direction; any one of the two driven jaws of the brake driven member is located between the two bent legs, and any one of the two bent legs is located between the driven jaws and the driving jaws; steps which extend outward in the widthwise direction of the driven jaws and are resisted against one side of the driving jaws are provided on two sides of one end of each of the driven jaws close to the brake driven member; and, gas for allowing the bent legs to extend therein are formed between the outer side of ends of the driven jaws away from the steps and the driving jaws.

In the tubular motor assembly using a coreless motor structure, the distance between the two bent legs of the brake torsion spring in the center line direction of the brake torsion spring is greater than the width of ends of the driven jaws away from the steps.

In the tubular motor assembly using a coreless motor structure, the brake mandrel includes a mandrel ring body coaxially connected to the brake drum; the mandrel ring body and the brake drum are of an integral structure, and the inner circumferential side of the mandrel ring body is communicated with the inner circumferential side of the brake drum to form a mandrel passage; the circumferential positioning structure includes a number of positioning slots formed on the inner circumferential side of one end of the brake outer sleeve; the positioning slots are arranged in the circumferential direction at uniform intervals and extend in the axial direction of the brake outer sleeve; a number of positioning lugs in one-to-one correspondence to the positioning slots are provided on the outer circumferential side of the mandrel ring body; and, the positioning lugs are clamped into the positioning slots, respectively.

In the tubular motor assembly using a coreless motor structure, the motor main body includes a motor shell; a carbon brush set connected to a control circuit is provided at one end of the motor shell; a rotor carrier with the motor shaft is rotatably provided on the carbon brush set, and a coreless coil is provided on the motor shaft; a permanent magnet located on the inner circumferential side of the coreless coil is provided within the motor shell; and, the motor shaft passes through the permanent magnet and extends to the outer side of the motor shell.

In the tubular motor assembly using a coreless motor structure, the brake driving member includes a driving mandrel which is coaxially and rotatably provided on the inner circumferential side of one end of the brake outer sleeve through a first rotating bearing; a driving member connecting hole is formed at one end of the driving mandrel, while the other end thereof is coaxially connected to a driving ring body; the driving jaws are correspondingly provided on the outer circumferential side of the driving ring body, respectively; and, one end of the driving ring body away from the driving mandrel is coaxially connected to a rotating drum.

In the tubular motor assembly using a coreless motor structure, the brake driven member include a driven mandrel which is coaxially and rotatably provided on the inner circumferential side of one end of the brake outer sleeve away from the driving mandrel through a second rotating bearing; a driven member connecting hole is formed at one end of the driven mandrel, while the other end thereof passes through the mandrel passage and is coaxially connected to a driven drum; the driven jaws are correspondingly provided on the outer circumferential side of one end of the driven drum, respectively; a rotating hole for allowing the rotating drum to be inserted therein is provided at one end of the driven drum, while a limiting ring body is provided at the other end thereof; and, an annular limiting step resisted against the limiting ring body is provided on the inner circumferential side of the brake drum.

Herein, the primary planetary gear assembly includes a primary planetary carrier having a primary planetary output shaft provided at its one end and connected to the driving member connecting hole; three primary planetary roller needles are provided on the primary planetary carrier in the circumferential direction at uniform intervals; primary planetary gears are provided on the primary planetary roller needles, and the primary planetary gears are distributed in the circumferential direction at uniform intervals and all connected to the motor shaft of the motor main body; a number of primary gear teeth meshed with the primary planetary gears are provided on the inner circumferential side of the primary gear ring; and, the primary gear teeth and the primary planetary gears are of helical tooth structures. The secondary planetary gear assembly includes a secondary planetary carrier having a secondary planetary output shaft provided at its one end; three secondary planetary roller needles are provided at the other end of the secondary planetary carrier; secondary planetary gears are provided on the secondary planetary roller needles; the secondary planetary gears are distributed in the circumferential direction at uniform intervals and all meshed with a secondary center gear connected to the driven member connecting hole; and, a number of secondary/tertiary gear teeth meshed with the secondary planetary gears are provided on the inner circumferential side of the secondary/tertiary gear ring. The tertiary planetary gear assembly includes a tertiary planetary carrier having an output shaft provided at its one end; three tertiary planetary roller needles are provided at the other end of the tertiary planetary carrier in the circumferential direction at uniform intervals; tertiary planetary gears are provided on the tertiary planetary roller needles; the tertiary planetary gears are distributed on the tertiary planetary gears in the circumferential direction at uniform intervals and all meshed with a small gear on the secondary planetary output shaft; and, secondary/tertiary gear teeth on the inner circumferential side of the secondary/tertiary gear ring are meshed with the tertiary planetary gears, respectively.

Preferably, the brake outer sleeve is provided between the primary gear ring and the secondary/tertiary gear ring through a circumferential fixation structure; the circumferential fixation structure includes a first concave-convex positioning assembly provided on the inner circumferential side of one end of the brake outer sleeve; a first concave-convex mating assembly corresponding to the first concave-convex positioning assembly is provided on the inner circumferential side of the primary gear ring; the first concave-convex positioning assembly and the first concave-convex matting assembly are mutually clamped and positioned in the circumferential direction; a second concave-convex assembly is provided on the inner circumferential side of the other end of the brake outer sleeve; a second concave-convex mating assembly corresponding to the second concave-convex positioning assembly is provided on the inner circumferential side of one end of the secondary/tertiary gear ring; and, the second concave-convex positioning assembly and the second concave-convex mating assembly are mutually clamped and positioned in the circumferential direction.

Compared with the prior art, the present invention has the following advantages.

1. Since the rotor core structure is omitted, the coreless motor does not experience a cogging effect and will not produce an eddy current, thereby reducing heat generation, reducing energy consumption and improving efficiency. Moreover, since there is no rotor core, the mass of the entire rotor is greatly reduced, so that the response speed of a rotor when starting and stopping is greatly improved and vibration is greatly attenuated, thus prolonging the service life of the entire machine.

2. The permanent magnet is arranged inside a rotor coil, so the radius of the rotor is increased when the outer diameter of the motor remains unchanged, and the output torque of the motor is increased.

3. The transmission between the primary planetary gear assembly and the secondary/tertiary planetary gear assembly is realized by the driving jaws and the driven jaws, and the brake driving member and the brake driven member each have two corners and are resisted against each other, so that the transmission stability is improved, the speed reduction ratio is large, the layout of components is rational, and the structure is compact.

4. By making the brake torsion spring be in interference fit with the brake mandrel, the braking process is realized by the deformation of the torsion spring, thereby achieving good braking effect of the brake and high braking sensitivity.

5. By supplying power by a battery, the charging interval period is longer, and the vibration and noise of the entire machine are greatly improved, the motor has higher mounting stability, and the components of the motor, the circuit board and the battery are firmly fixed and high in reliability.

Figure 1:
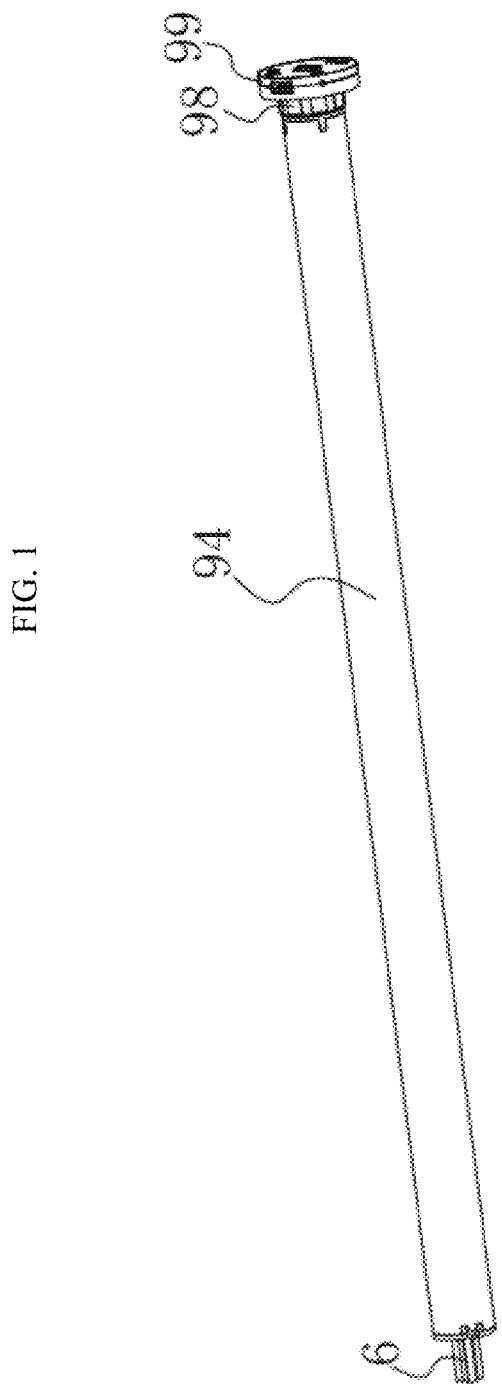
FIG. 1 is a schematic structure diagram according to the present invention.
Figure 2:
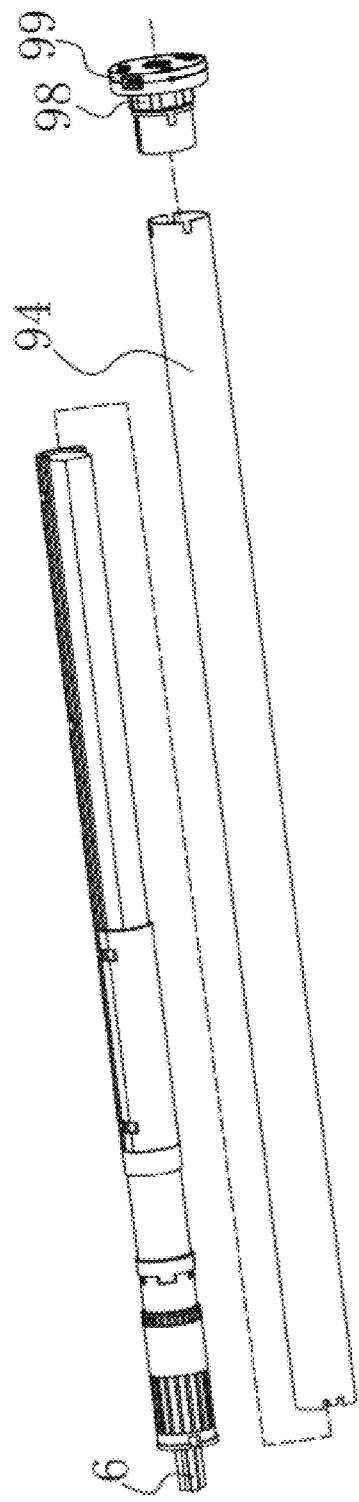
FIG. 2 is an exploded view according to the present invention.
Figure 3:
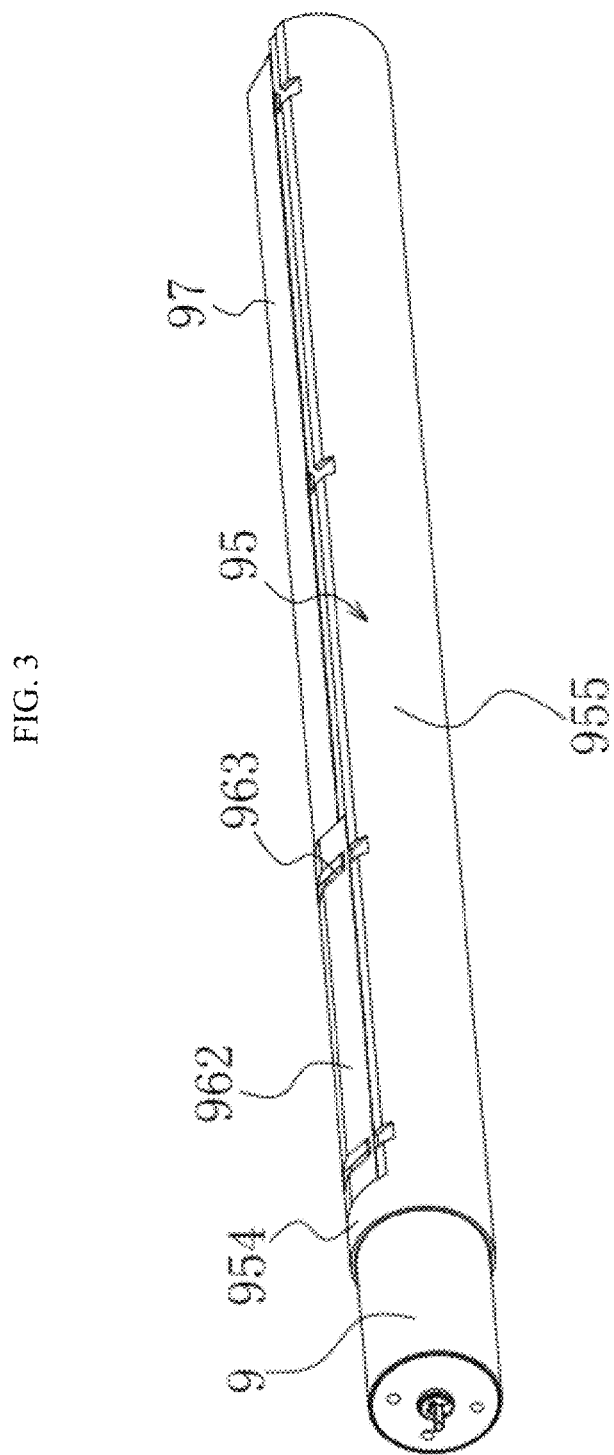
FIG. 3 is a schematic structure diagram when a motor main body is connected to a battery circuit board housing according to the present invention.
Figure 4:
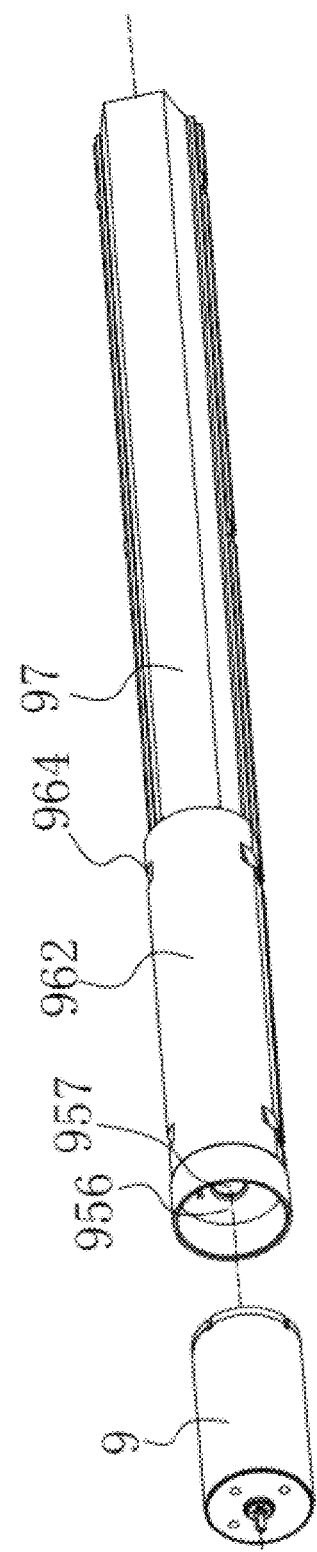
FIG. 4 is an exploded view when the motor main body is connected to the battery circuit board housing according to the present invention.
Figure 5:
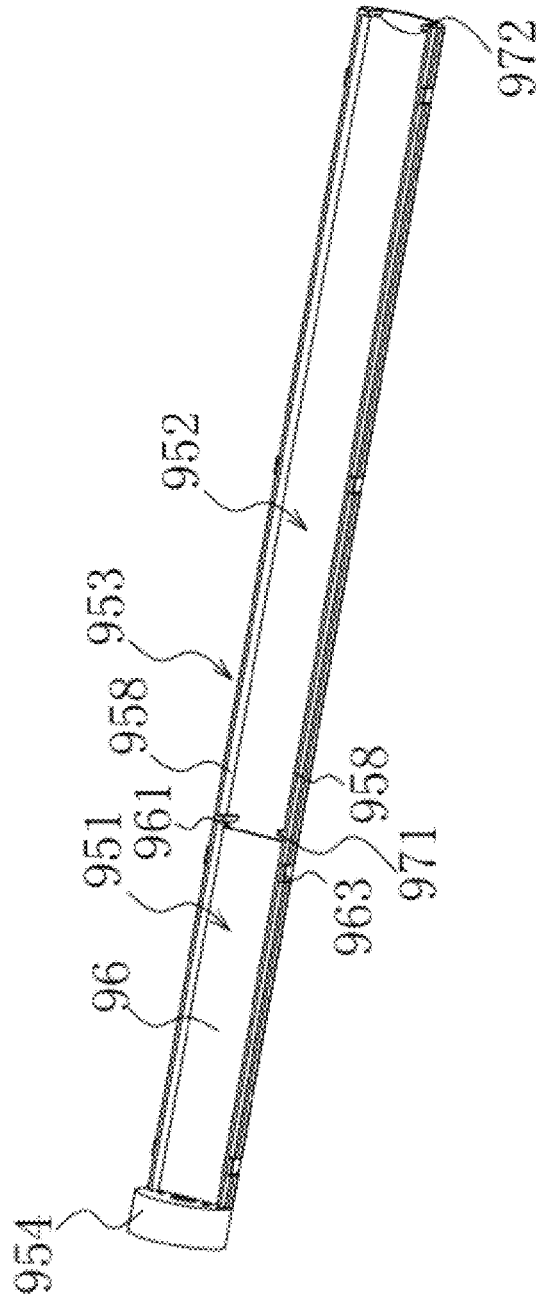
FIG. 5 is a schematic structure diagram of the battery circuit board housing according to the present invention.
Figure 6:
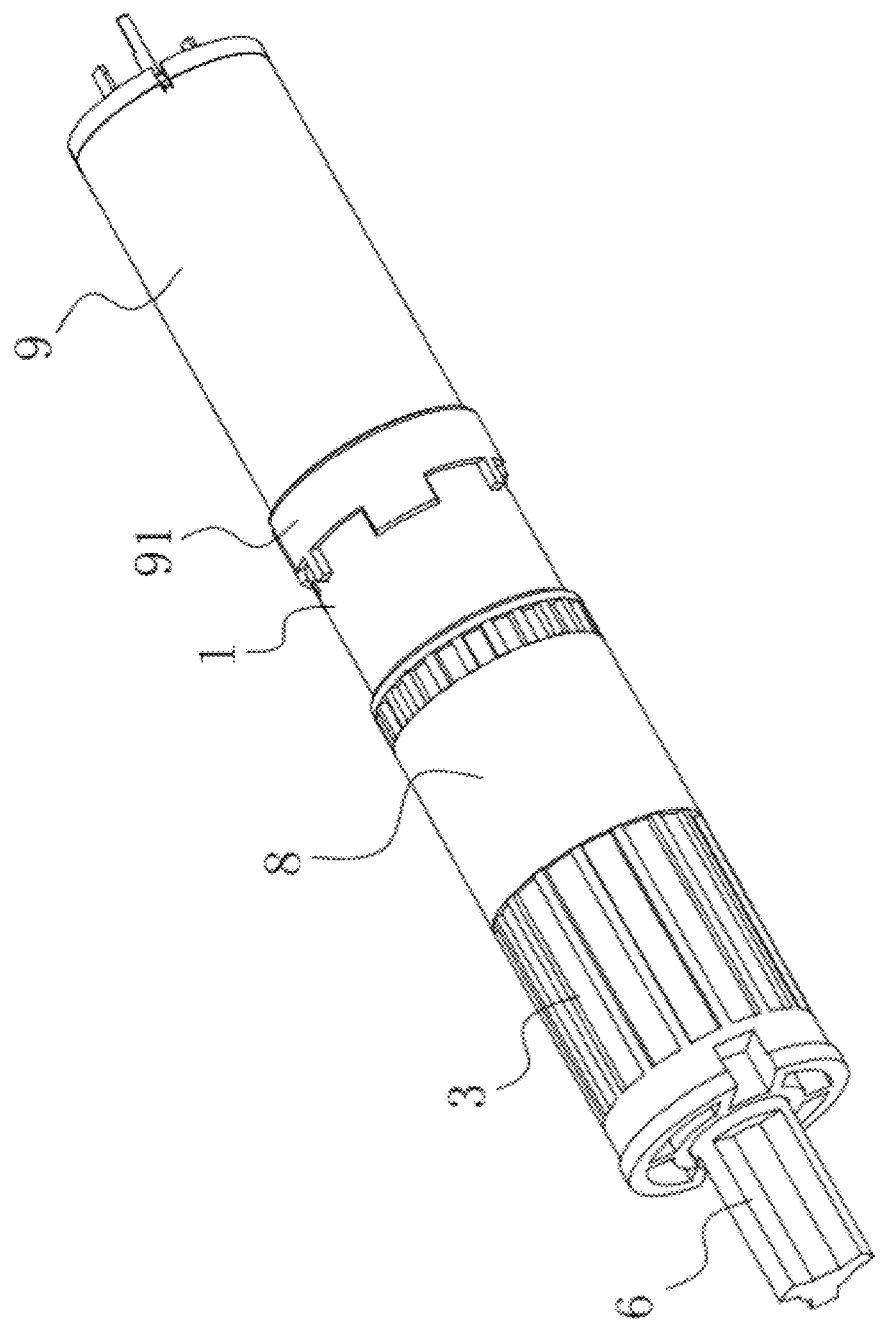
FIG. 6 is a schematic structure diagram when the motor main body is connected to a transmission structure according to the present invention.
Figure 7:
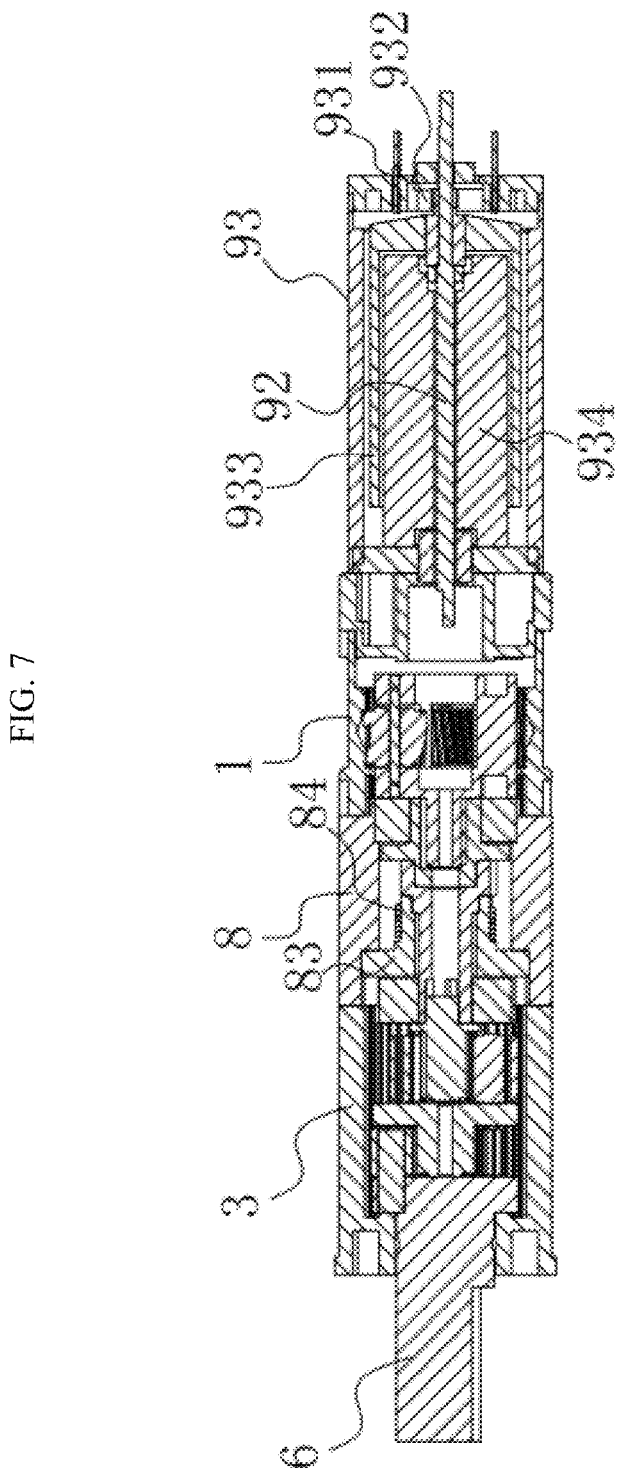
FIG. 7 is a sectional view when the motor main body is connected to the transmission structure according to the present invention.
Figure 8:
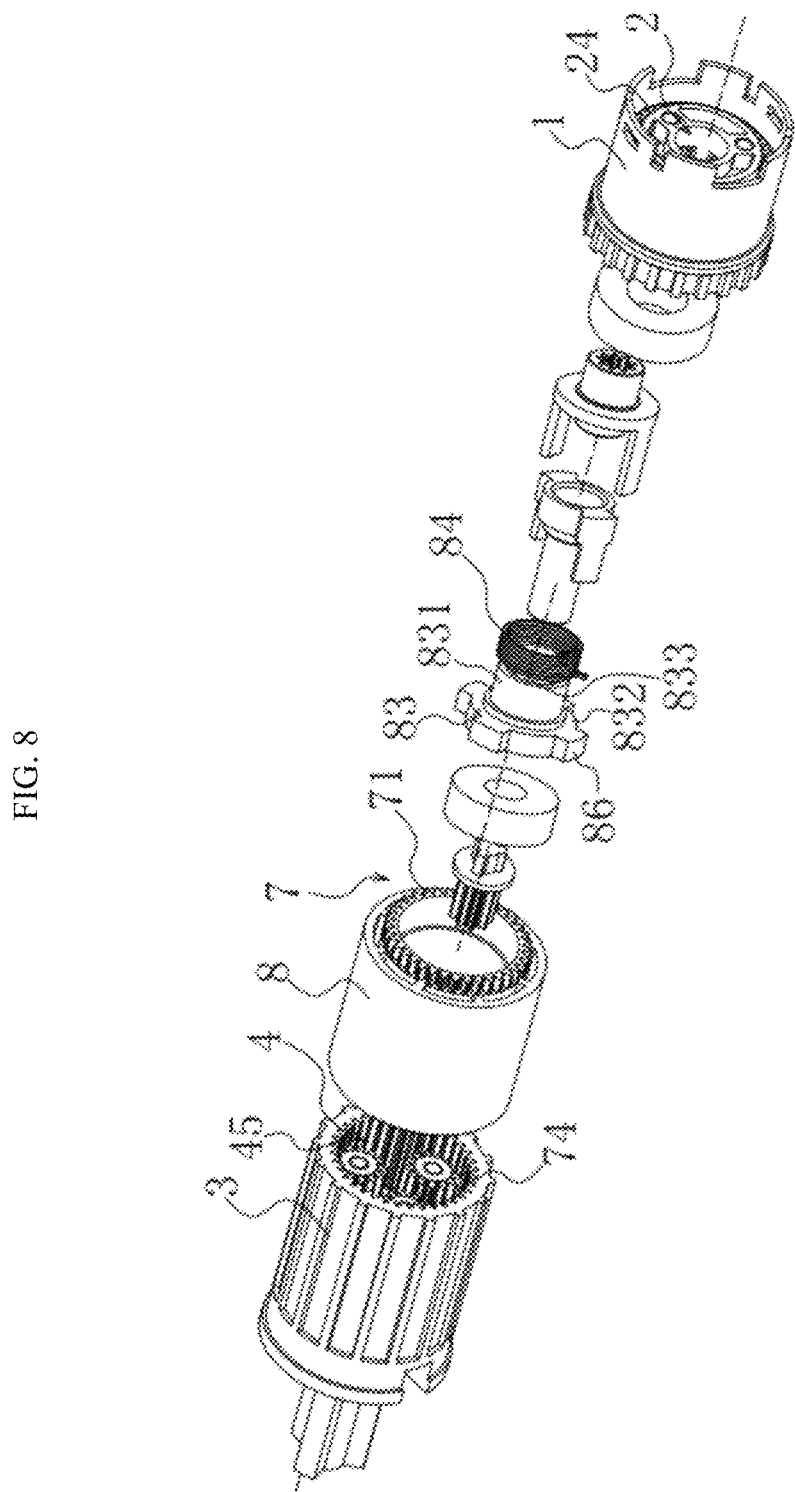
FIG. 8 is an exploded view when the motor main body is not mounted to the transmission structure according to the present invention.
Figure 9:
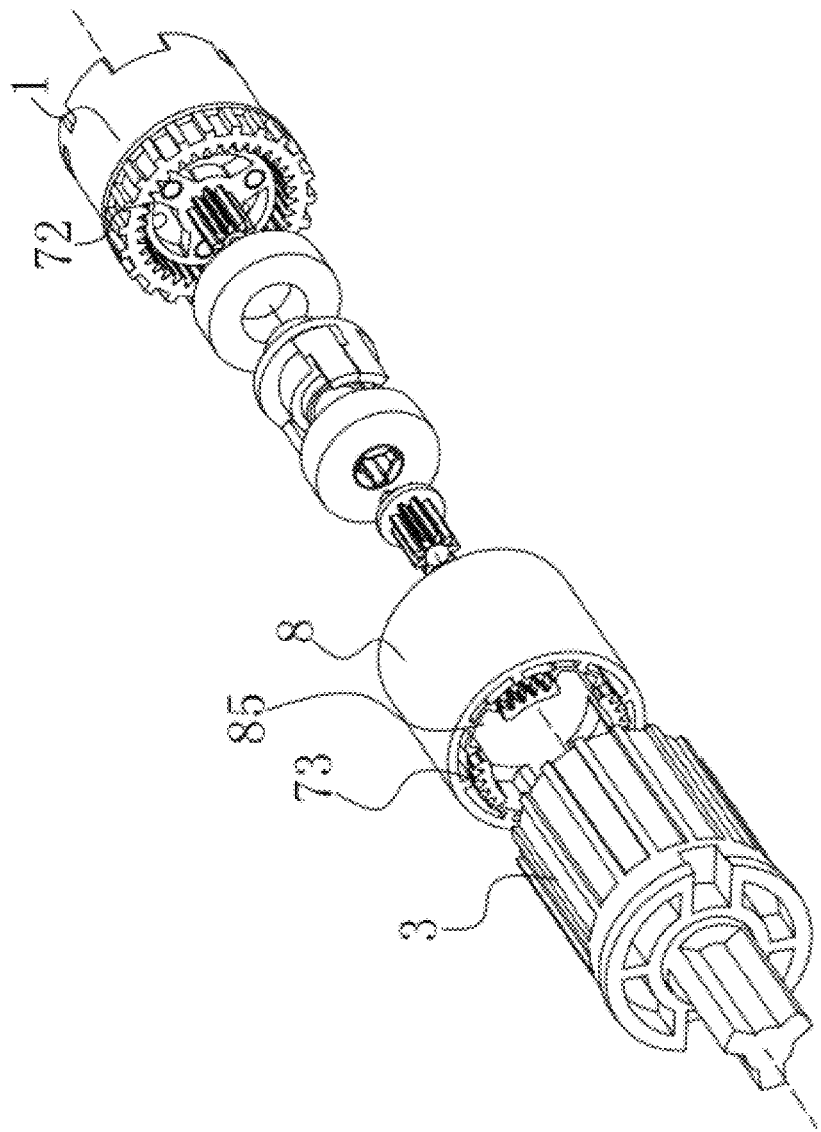
FIG. 9 is an exploded view from another perspective when the motor main body is not mounted to the transmission structure according to the present invention.
Figure 10:
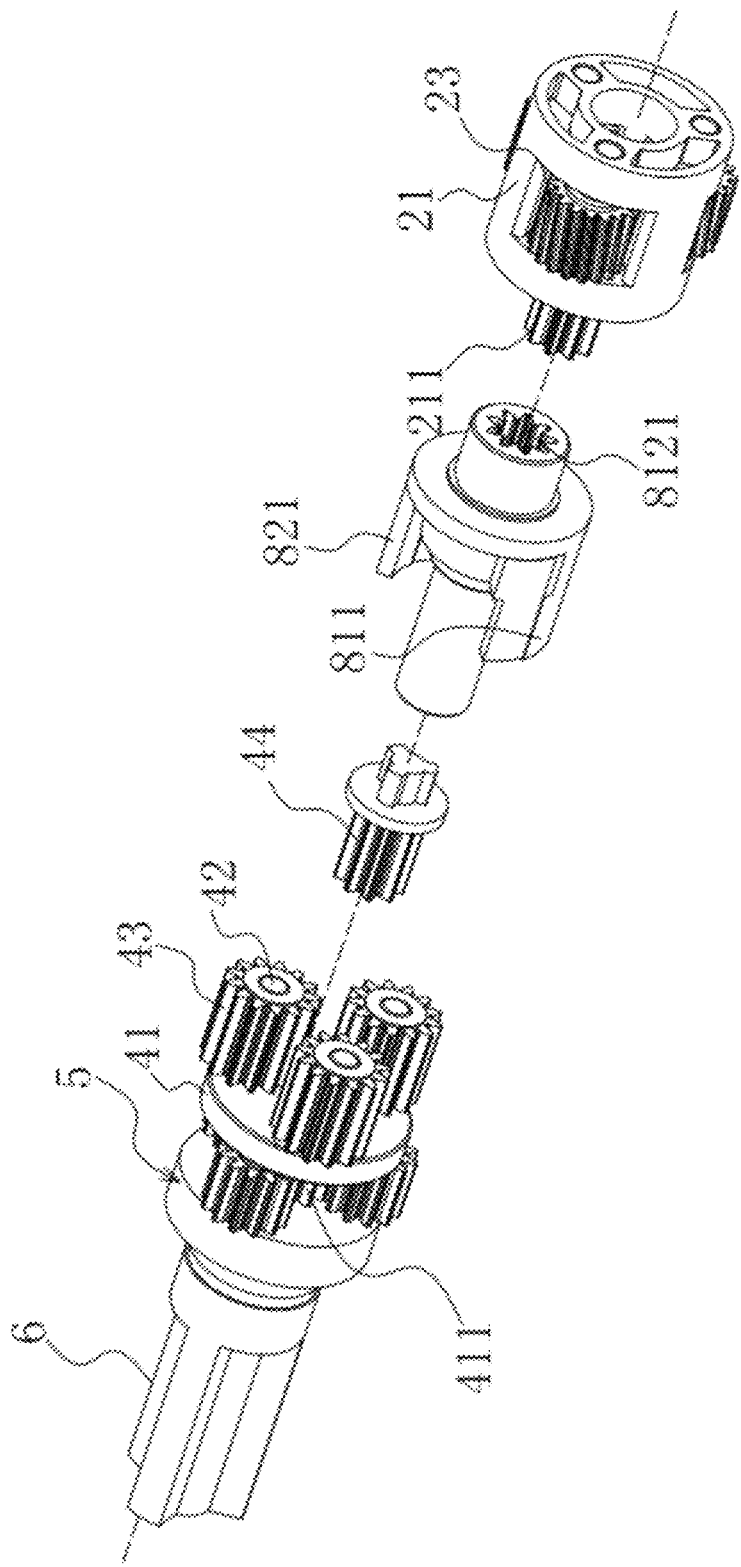
FIG. 10 is an exploded view when planetary gear assemblies are connected according to the present invention.
Figure 11:
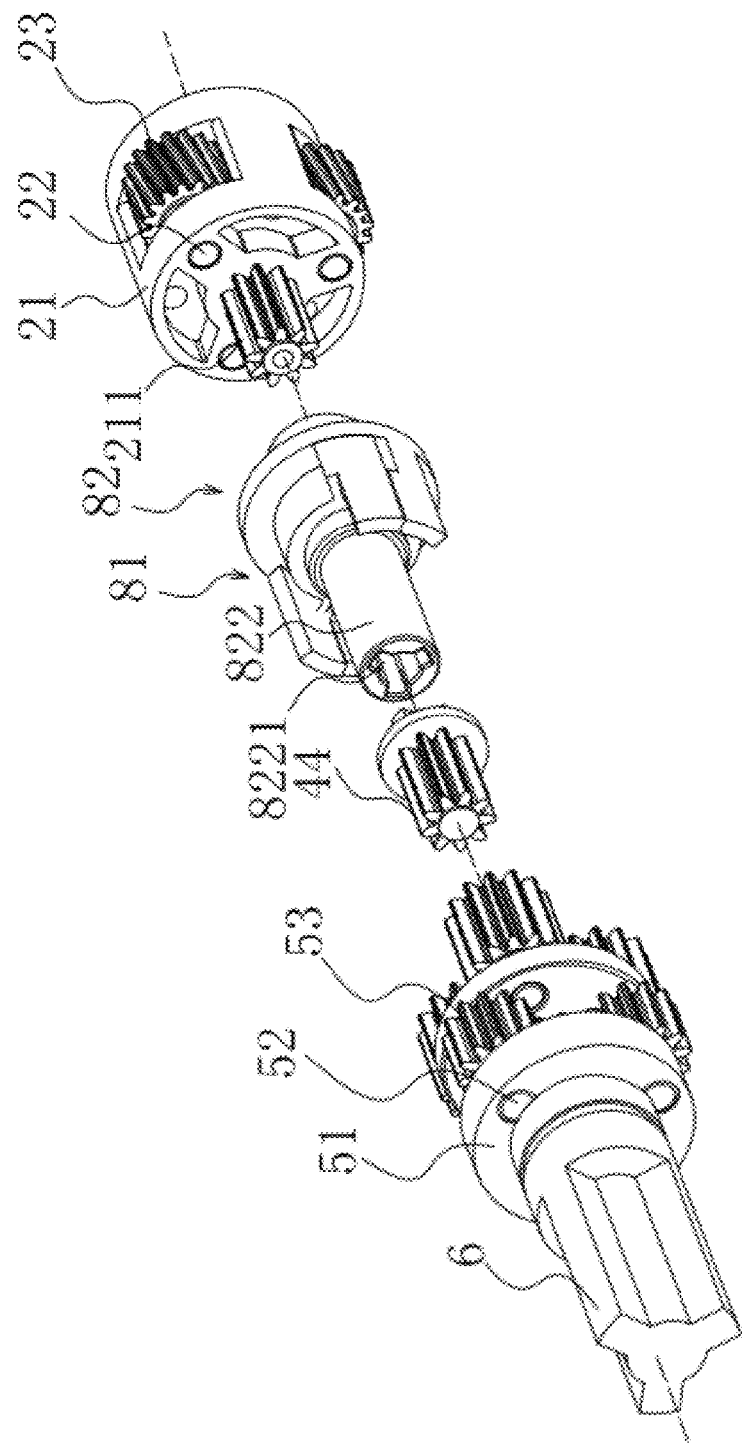
FIG. 11 is an exploded view from another perspective when planetary gear assemblies connected are connected according to the present invention.
Figure 12:
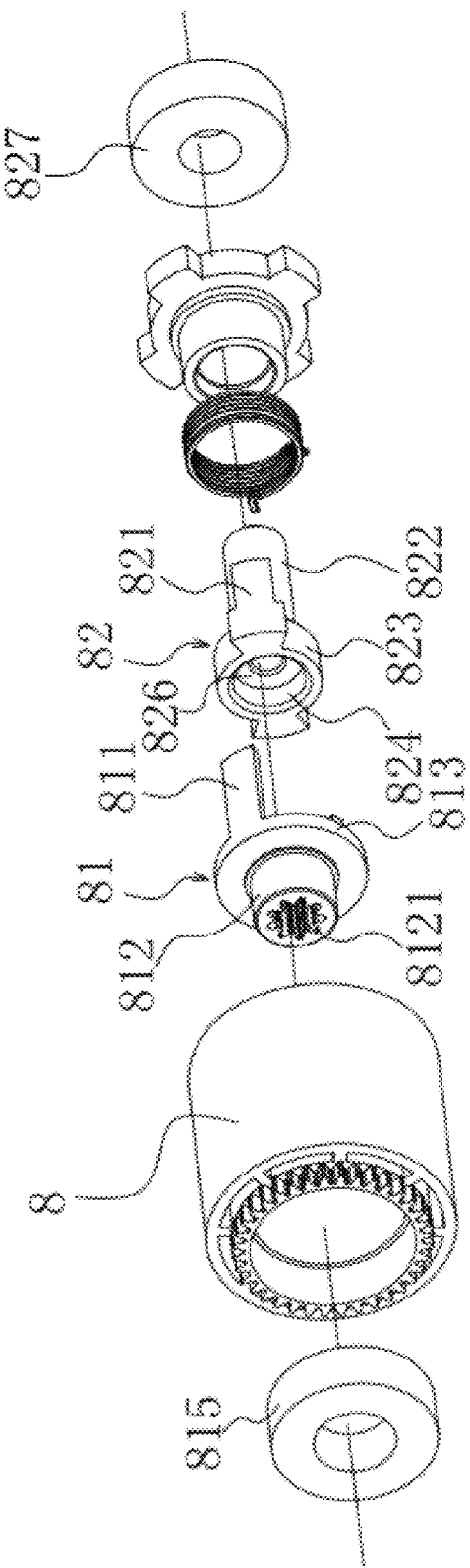
FIG. 12 is a partially exploded view of the transmission structure according to the present invention.
Figure 13:
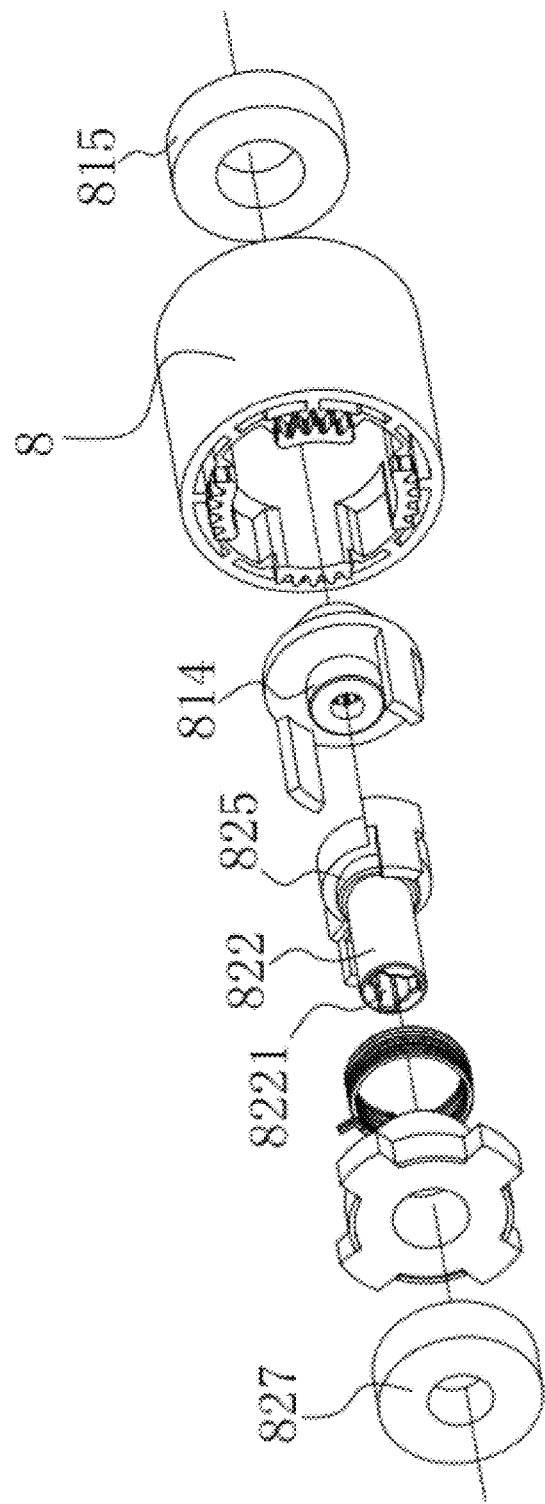
FIG. 13 is a partially exploded view from another perspective according to the present invention.

in which: 1: primary gear ring; 2: primary planetary gear assembly; 21: primary planetary carrier; 211: primary planetary output shaft; 22: primary planetary roller needle; 23: primary planetary gear; 24: primary gear tooth; 3: secondary/tertiary gear ring; 4: secondary planetary gear assembly; 41: secondary planetary carrier; 411: secondary planetary output shaft; 42: secondary planetary roller needle; 43: secondary planetary gear; 44: secondary center gear; 45: secondary/tertiary gear tooth; 5: tertiary planetary gear assembly; 51: tertiary planetary carrier; 52: tertiary planetary roller needle; 53: tertiary planetary gear; 6: output shaft; 7: circumferential fixation structure; 71: first concave-convex positioning assembly; 72: first concave-convex mating assembly; 73: second concave-convex positioning assembly; 74: second concave-convex mating assembly; 8: brake outer sleeve; 81: brake driving member; 811: driving jaw; 812: driving mandrel; 8121: driving member connecting hole; 813: driving ring body; 814: rotating drum; 815: first rotating bearing; 82: brake driven member; 821: driven jaw; 821*a*: step; 821*b*: gap; 822: driven mandrel; 8221: driven member connecting hole; 823: driven drum; 824: rotating hole; 825: limiting ring body; 826: annular limiting step; 827: second rotating bearing; 83: brake mandrel; 831: brake drum; 832: mandrel ring body; 833: mandrel passage; 84: brake torsion spring; 841: bent leg; 85: positioning slot; 86: positioning lug; 9: motor main body; 91: motor connecting seat; 92: motor shaft; 93: motor shell; 931: carbon brush set; 932: rotor carrier; 933: coreless coil; 934: permanent magnet; 94: steel tube body; 95: battery circuit board housing; 951: circuit board mounting region; 952: battery mounting region; 953: mounting opening; 954: motor mounting drum; 955: battery circuit board mounting drum; 956: closure plate; 957: through hole; 958: mounting plate; 96: control circuit board; 961: positioning step; 962: battery circuit board upper housing; 963: snap; 964: neck; 97: power supply battery; 971: partition plate; 972: battery limiting portion; 98: limiting ring; and, 99: cover body.

DETAILED DESCRIPTION OF THE INVENTION

The present invention will be further described below in detail by specific implementations with reference to the accompanying drawings.

As shown in FIGS. 1-5 and 7, the tubular motor assembly using a coreless motor structure includes a hollow steel tube body 94. A motor main body 9 is internally provided in the steel tube body 94. The motor main body 9 is a coreless motor. Herein, the motor main body 9 includes a motor shell 93. A carbon brush set 931 connected to a control circuit is provided at one end of the motor shell 93. A rotor carrier 932 with the motor shaft 92 is rotatably provided on the carbon brush set 931, and a coreless coil 933 is provided on the motor shaft 92. A permanent magnet 934 located on the inner circumferential side of the coreless coil 933 is provided within the motor shell 93. The motor shaft 92 passes through the permanent magnet 934 and extends to the outer side of the motor shell 93. Preferably, herein, one end of the motor main body 9 is inserted at one end of a battery circuit board housing 95. A control circuit board 96 and/or a power supply battery 97 which is connected to the motor main body 9 and has a control circuit is provided within the battery circuit board housing 95 through a battery circuit board positioning structure. Preferably, herein, the power supply battery 97 may be a rechargeable battery. By supplying power by the battery, the charging interval period is longer, and the vibration and noise of the entire machine are greatly improved.

Since the rotor core structure is omitted in the motor main body 9, the coreless motor does not experience a cogging effect and will not produce an eddy current, thereby reducing heat generation, reducing energy consumption and improving efficiency. Moreover, since there is no rotor core, the mass of the entire rotor is greatly reduced, so that the response speed of a rotor when starting and stopping is greatly improved and vibration is greatly attenuated, thus prolonging the service life of the entire machine. Meanwhile, the permanent magnet 934 is arranged inside a rotor coil, so the radius of the rotor is increased when the outer diameter of the motor remains unchanged, and the output torque of the motor is increased.

Further, in this embodiment, the battery circuit board positioning structure includes a circuit board mounting region 951 and a battery mounting region 952 successively formed within the battery circuit board housing 95. A mounting opening 953 which extends in the axial direction of the battery circuit board housing 95 and is respectively communicated with the circuit board mounting region 951 and the battery mounting region 952 is formed on the outer circumferential side of the battery circuit board housing 95. The control circuit board 96 is provided within the circuit board mounting region 951 through a first positioning structure, and the power supply battery 97 is provided within the battery mounting region 952 through a second positioning structure.

Preferably, herein, the battery circuit board housing 95 includes a cylindrical motor mounting drum 954. The motor mounting drum 954 is coaxially connected to a battery circuit board mounting drum 955. The circuit board mounting region 951 and the battery mounting region 952 are successively formed within the battery circuit board mounting drum 955. The mounting opening 953 is axially provided on the outer circumferential side of the battery circuit board mounting drum 955, and one end of the motor main body 9 is inserted into the motor mounting drum 954. The motor mounting drum 954 and the battery circuit board mounting drum 955 are separated from each other through a closure plate 956, a number of through holes 957 for allowing terminals at one end of the motor main body 9 to be inserted therein are formed on the closure plate 956, and the terminals of the motor main body 9 are connected to the control circuit board 96, respectively. Mounting plates 958 which go beyond the mounting opening 953 and extend in the axial direction of the battery circuit board mounting drum 955 are provided on two sides of the mounting opening 953, respectively. The mounting plates 958 are parallel to each other; and, one end of each of the mounting plates 958 is connected to the closure plate 956, while the other end thereof extends to an end of the battery circuit board mounting drum 955.

Preferably, herein, the first positioning structure includes positioning steps 961 provided on bottoms of opposite sides of the mounting plates 958. Two sides of the control circuit board 96 are clamped between the two mounting plates 958, and the inner side of the control circuit board 96 is resisted against the positioning steps 961. A battery circuit board upper housing 962 which can seal the part of the mounting opening 953 corresponding to the control circuit board 96 and is shaped as an arc-shaped plate is provided on the battery circuit board mounting drum 955 through a detachable assembly. Herein, the detachable assembly includes a number of snaps 963 or necks 964 provided on the outer sides of the mounting plates 958, respectively; a number of necks 964 or snaps 963 are provided on two sides of the battery circuit board upper housing 962, respectively; the snaps 963 are clamped into the necks 964; and, the battery circuit board upper housing 962 and the battery circuit board mounting drum 955 are encircled to form a cylindrical structure. In addition, herein, the second positioning structure includes a partition plate 971 which is provided between the two mounting plates 958 and partitions the inner cavity of the battery circuit board housing 95 into the circuit board mounting region 951 and the battery mounting region 952; a battery limiting portion 972 connected to the mounting plates 958 is provided at one end of the battery circuit board mounting drum 955 away from the circuit board mounting region 951; the power supply battery 97 is rod-shaped and clamped between the partition plate 971 and the battery limiting portion 972; and, the outer side of the power supply battery 97 goes beyond the mounting opening 953. The motor mounting drum 954 and the battery circuit board mounting drum 955 are connected to form an integral structure, the outer side of the motor mounting drum 954 is flush with the outer side of the battery circuit board upper housing 962, and the outer side of the power supply battery 97 does not go beyond the outer side of the motor mounting drum 954.

Furthermore, as shown in FIGS. 1-2 and 6-13, in this embodiment, the transmission structure of the motor main body mainly includes the following. Herein, one end of the motor main body 9 is connected to one end of a primary gear ring 1 through a motor connecting seat 91, and a motor shaft 92 of the motor main body 9 is connected to a primary planetary gear assembly 2 provided within the primary gear ring 1. The other end of the primary gear ring 1 is connected to a secondary/tertiary gear ring 3 having a secondary planetary gear assembly 4 and a tertiary gear ring 5 connected to each other through a brake outer sleeve 8. The primary planetary gear assembly is connected to the secondary planetary gear assembly 4 through a brake structure located in the brake outer sleeve 8, and the tertiary planetary gear assembly 5 is connected to an output shaft 6 which extends to the outer side of one end of the steel tube body 94. The other end of the steel tube body 94 away from the output shaft 6 is connected to a cover body 99 through a limiting ring 98. Herein, a fixation hole connected to an external shaft is formed on the cover body 99. It is also possible to provide a charging interface, a data interface or the like connected to the control circuit board 96 or the power supply battery 97.

Preferably, herein, the brake structure includes a brake mandrel 83 which is provided within the brake outer sleeve 8 through a circumferential positioning structure. A cylindrical brake drum 831 is provided at one end of the brake mandrel 83, and a brake torsion spring 84 is sleeved on the brake drum 831. A brake driving member 81 and a brake driven member 82 arranged coaxially are internally provided in the brake outer sleeve 8. The brake driving member 81 is connected to an output end of the primary planetary gear assembly 2, and the brake driven member 82 is connected to an input end of the secondary planetary gear assembly 4. The brake driving member 81 is provided with two driving jaws 811, and one end of the brake driven member 82 close to the brake driving member 81 passes through the brake mandrel 83 and is provided with two driven jaws 821. The driving jaws 811 and the driven jaws 821 are staggered one by one, and any one of the driving jaws 811 is located on one side of any one of the driven jaws 821. A brake control assembly, which enables the brake torsion spring 84 to expand in the circumferential direction and the brake driven member 82 to rotate synchronously with the brake driving member 81 in the same direction when the brake driving member 81 rotates in the circumferential direction or enables the brake torsion spring 84 to contract in the circumferential direction and the brake driven member 82 to stop in the circumferential direction when the brake driven member 82 rotates in the circumferential direction, is provided between the driving jaws 811 and the driven jaws 821.

Specifically, herein, the brake control structure includes bent legs 841 which are formed at two ends of the brake torsion spring 84 and bent outward in the radial direction. Any one of the two driven jaws 821 of the brake driven member 82 is located between the two bent legs 841, and any one of the two bent legs 841 is located between the driven jaws 821 and the driving jaws 811. Steps 821*a* which extend outward in the widthwise direction of the driven jaws 821 and are resisted against one side of the driving jaws 811 are provided on two sides of one end of each of the driven jaws 821 close to the brake driven member 82. Gaps 821*b* for allowing the bent legs 841 to extend therein are formed between the outer side of ends of the driven jaws 821*a* away from the steps 821*a* and the driving jaws 811. Herein, the distance between the two bent legs 841 of the brake torsion spring 84 in the center line direction of the brake torsion spring 84 is greater than the width of ends of the driven jaws 821 away from the steps 821*a*.

Preferably, herein, the brake mandrel 83 includes a mandrel ring body 832 coaxially connected to the brake drum 831. The mandrel ring body 832 and the brake drum 831 are of an integral structure, and the inner circumferential side of the mandrel ring body 832 is communicated with the inner circumferential side of the brake drum 831 to form a mandrel passage 833. The circumferential positioning structure includes a number of positioning slots 85 formed on the inner circumferential side of one end of the brake outer sleeve 8. The positioning slots 85 are arranged in the circumferential direction at uniform intervals and extend in the axial direction of the brake outer sleeve 8. A number of positioning lugs 86 in one-to-one correspondence to the positioning slots 85 are provided on the outer circumferential side of the mandrel ring body 832. The positioning lugs 86 are clamped into the positioning slots 85, respectively.

The primary planetary gear assembly 2 is transmitted to the secondary planetary gear assembly 4 through the driving jaws 811 and the driven jaws 821 and then connected to the output shaft 6 through the tertiary planetary gear assembly 5, so that the transmission stability is improved. Meanwhile, a brake mandrel 83 can be provided within the brake outer sleeve 8, a brake torsion spring 84 is sleeved on the brake mandrel 83, and the brake torsion spring 84 acts on the driving jaws 811 and the driven jaws 821, respectively, so that the purpose of providing a brake between the primary planetary gear assembly and the secondary and tertiary planetary gear assemblies is achieved.

Figure 14:
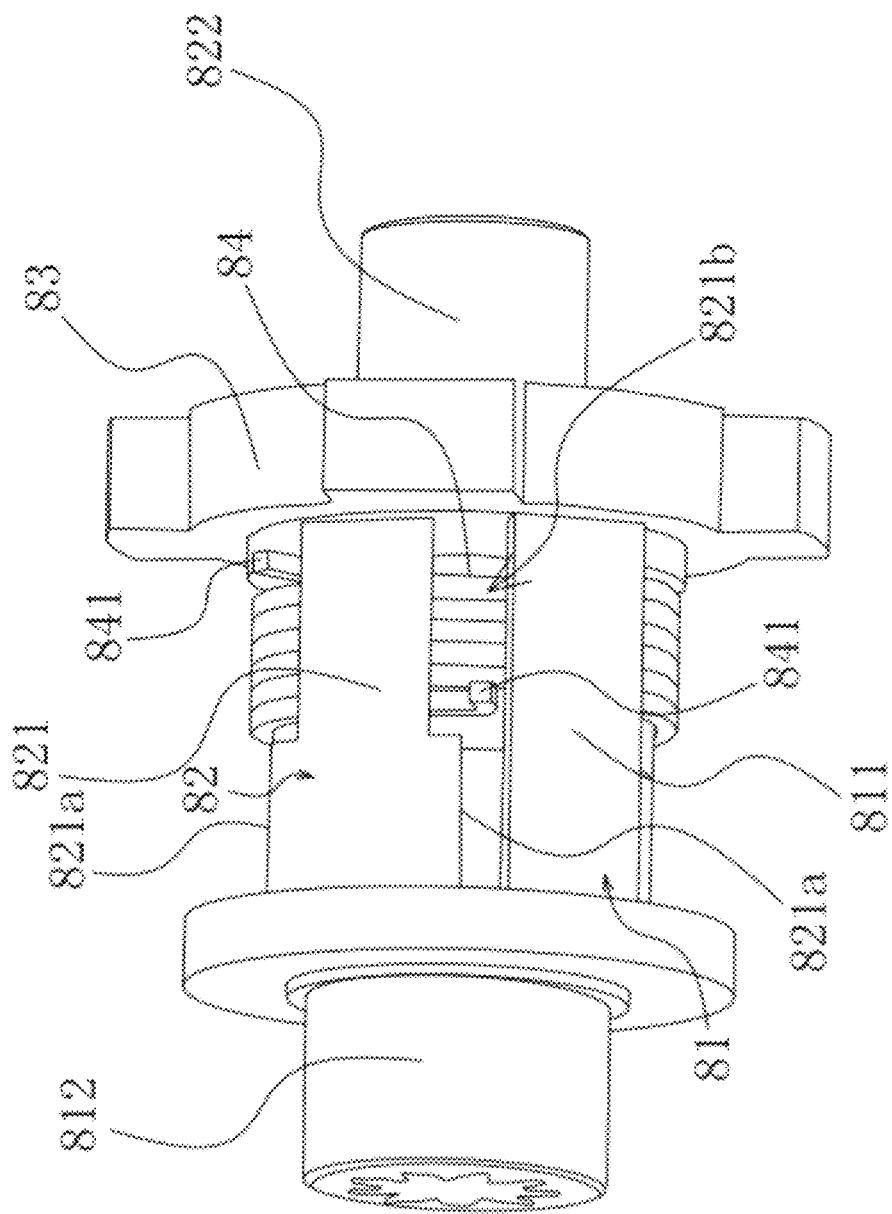
FIG. 14 is a schematic structure diagram of a braking process according to the present invention.

Specifically, as shown in FIG. 14, no manner when the brake driving member 81 rotates forward or backward in the circumferential direction, the driving jaws 811 are driven to rotate together. The driving jaws 811 first come into contact with one bent leg 841 of the brake torsion spring 84. When the driving jaws 811 push the bent legs 841, the brake torsion spring 84 expands in the circumferential direction, so that the inner diameter of the brake torsion spring 84 becomes larger, and the brake torsion spring 84 is separated from the brake mandrel 83. When the driving jaws 811 continuously rotates to drive the bent legs 841 to move in the gaps 821*b*, the inner diameter of the brake torsion spring 84 further becomes larger until one side of the driving jaws 811 is resisted against the steps 821*a* of the driven jaws 821, so that the driving jaws 811 drive the driven jaws 821 to rotate synchronously when the brake torsion spring 841 is in an expanded state, and the power is transferred to a next stage. No matter when the brake driven member 82 rotates forward or backward in the circumferential direction, the driven jaws 821 are driven to rotate together. Before the steps 821*a* of the driven jaws 821 do not come into with the driving jaws 811, the driven jaws 821 first make the inner diameter of the brake torsion spring 84 smaller, so that the brake torsion spring 84 is tightly clung to the brake mandrel 83, and a large friction is generated between the brake torsion spring 84 and the brake mandrel 83. Thus, the whole braking process is realized, and the power will not be transferred to the brake driving member 81.

For the brake part in this embodiment, the brake mandrel 83 and the brake outer sleeve 8 are fixed. The brake torsion spring 84 is in interference fit with the brake mandrel 83, and the brake driving member 81 and the brake driven member 82 each have two corners. During rotation, the torque of the motor shaft 92 is transferred to the brake driving member 81 through the primary planetary gear assembly 2. Regardless of clockwise rotation or counterclockwise rotation, the brake driving member 81 will make the inner diameter of the brake torsion spring 84 larger, so that the brake torsion spring 84 is separated from the brake mandrel 83, and the torque is transferred to the driven member 82, then transferred to the secondary planetary gear assembly 4 and the tertiary planetary gear assembly 5 and finally transferred out by the output shaft 6. When the torque is transferred from the output shaft 6 to the secondary planetary gear assembly 4 and the tertiary planetary gear assembly 5 and then to the brake driven member 82, regardless of clockwise rotation or counterclockwise rotation, the brake driven member 82 will make the inner diameter of the brake torsion spring 84 smaller, so that the brake torsion spring 84 is tightly clung to the brake mandrel 83, and a large friction is generated between the brake torsion spring 84 and the brake mandrel 83. Moreover, since the brake mandrel 83 is fixed, the torque cannot be transferred to the primary planetary gear assembly 2, thereby realizing the braking effect.

Herein, the brake driving member 81 includes a driving mandrel 812 which is coaxially and rotatably provided on the inner circumferential side of one end of the brake outer sleeve 8 through a first rotating bearing 815. A driving member connecting hole 8121 is formed at one end of the driving mandrel 812, while the other end thereof is coaxially connected to a driving ring body 813. The driving jaws 811 are correspondingly provided on the outer circumferential side of the driving ring body 813, respectively. One end of the driving ring body 813 away from the driving mandrel 812 is coaxially connected to a rotating drum 814.

Further, the brake driven member 82 includes a driven mandrel 822 which is coaxially and rotatably provided on the inner circumferential side of one end of the brake outer sleeve 8 away from the driving mandrel 812 through a second rotating bearing 827. A driven member connecting hole 8221 is formed at one end of the driven mandrel 822, while the other end thereof passes through the mandrel passage 833 and is coaxially connected to a driven drum 823. The driven jaws 821 are correspondingly provided on the outer circumferential side of one end of the driven drum 823, respectively. A rotating hole 824 for allowing the rotating drum 814 to be inserted therein is formed at one end of the driven drum 823, while a limiting ring body 825 is provided at the other end thereof. An annular limiting step 826 resisted against the limiting ring body 825 is provided on the inner circumferential side of the brake drum 831.

The primary planetary gear assembly 2 includes a primary planetary carrier 21 having a primary planetary output shaft 211 provided at its one end and connected to the driving member connecting hole 8121. Three primary planetary roller needles 22 are provided on the primary planetary carrier 21 in the circumferential direction at uniform intervals. Primary planetary gears 23 are provided on the primary planetary roller needles 22, and the primary planetary gears 23 are distributed in the circumferential direction at uniform intervals and all connected to the motor shaft 92 of the motor main body 9. A number of primary gear teeth 24 meshed with the primary planetary gears 23 are provided on the inner circumferential side of the primary gear ring 1. The primary gear teeth 24 and the primary planetary gears 23 are of helical tooth structures.

Similarly, herein, the secondary planetary gear assembly 4 includes a secondary planetary carrier 41 having a secondary planetary output shaft 411 provided at its one end. Three secondary planetary roller needles 42 are provided at the other end of the secondary planetary carrier 41, and secondary planetary gears 43 are provided on the secondary planetary roller needles 42. The secondary planetary gears 43 are distributed in the circumferential direction at uniform intervals and all meshed with a secondary center gear 44 connected to the driven member connecting hole 8221. A number of secondary/tertiary gear teeth 45 meshed with the secondary planetary gears 43 are provided on the inner circumferential side of the secondary/tertiary gear ring 3.

Herein, the tertiary planetary gear assembly 5 includes a tertiary planetary carrier 51 having an output shaft 6 provided at its one end. Three tertiary planetary roller needles 52 are provided at the other end of the tertiary planetary carrier 51 in the circumferential direction at uniform intervals, and tertiary planetary gears 53 are provided on the tertiary planetary roller needles 52. The tertiary planetary gears 53 are distributed in the circumferential direction at uniform intervals and all meshed with a small gear on the secondary planetary output shaft 411. The secondary/tertiary gear teeth 45 on the inner circumferential side of the secondary/tertiary gear ring 3 are meshed with the tertiary planetary gears 53, respectively.

In order to position the primary gear ring 1 and the secondary/tertiary gear ring 3 at two ends of the brake outer sleeve 8, herein, the brake outer sleeve 8 is provided between the primary gear ring 1 and the secondary/tertiary gear ring 3 through a circumferential fixation structure 7. Preferably, the circumferential fixation structure 7 includes a first concave-convex positioning assembly 71 provided on the outer circumferential side of one end of the brake outer sleeve 8. A first concave-convex mating assembly 72 corresponding to the first concave-convex positioning assembly 71 is provided on the inner circumferential side of one end of the primary gear ring 1. The first concave-convex positioning assembly 71 and the first concave-convex mating assembly 72 are mutually clamped and positioned in the circumferential direction. A second concave-convex positioning assembly 73 is provided on the outer circumferential side of the other end of the brake outer sleeve 8. A second concave-convex mating assembly 74 corresponding to the second concave-convex positioning assembly 73 is provided on the inner circumferential side of the secondary/tertiary gear ring 3. The second concave-convex positioning assembly 73 and the second concave-convex mating assembly 74 are mutually clamped and positioned in the circumferential direction. Preferably, herein, all the first concave-convex positioning assembly 71, the first concave-convex mating assembly 72, the second concave-convex positioning assembly 73 and the second concave-convex mating assembly 74 can be of positioning teeth structures, so that circumferential positioning is realized by inserting teeth into each other.

The specific embodiments described herein are merely for illustrating the spirit of the present invention. Those skilled in the art can make various modifications or supplements to the specific embodiments described herein or replace the specific embodiments described herein in a similar way, without departing from the spirit of the present invention or the scope defined by the appended claims.

Although the terms such as the primary gear ring 1, the primary planetary gear assembly 2, the primary planetary carrier 21, the primary planetary output shaft 211, the primary planetary roller needle 22, the primary planetary gear 23, the primary gear tooth 24, the secondary/tertiary gear ring 3, the secondary planetary gear assembly 4, the secondary planetary carrier 41, the secondary planetary output shaft 411, the secondary planetary roller needle 42, the secondary planetary gear 43, the secondary center gear 44, the secondary/tertiary gear tooth 45, the tertiary planetary gear assembly 5, the tertiary planetary carrier 51, the tertiary planetary roller needle 52, the tertiary planetary gear 53, the output shaft 6, the circumferential fixation structure 7, the first concave-convex positioning assembly 71, the first concave-convex mating assembly 72, the second concave-convex positioning assembly 73, the second concave-convex mating assembly 74, the brake outer sleeve 8, the brake driving member 81, the driving jaw 811, the driving mandrel 812, the driving member connecting hole 8121, the driving ring body 813, the rotating drum 814, the first rotating bearing 815, the brake driven member 82, the driven jaw 821, the step 812a, the gap 812b, the driven mandrel 822, the driven member connecting hole 8221, the driven drum 823, the rotating hole 824, the limiting ring body 825, the annular limiting step 826, the second rotating bearing 827, the brake mandrel 83, the brake drum 831, the mandrel ring body 832, the mandrel passage 833, the brake torsion spring 84, the bent leg 841, the positioning slot 85, the positioning lug 86, the motor main body 9, the motor connecting seat 91, the motor shaft 92, the motor shell 93, the carbon brush set 931, the rotor carrier 932, the coreless coil 933, the permanent magnet 934, the steel tube body 94, the battery circuit board housing 95, the circuit board mounting region 951, the battery mounting region 952, the mounting opening 953, the motor mounting drum 954, the battery circuit board mounting drum 955, the closure plate 956, the through hole 957, the mounting plate 958, the control circuit board 96, the positioning step 961, the battery circuit board upper housing 962, the snap 963, the neck 964, the power supply battery 97, the partition plate 971, the battery limiting portion 972, the limiting ring 98 and the cover body 99 are frequently used herein, the possibility of using other terms is not excluded. These terms are merely used to describe and explain the essence of the present invention more conveniently, and the interpretation of the terms into any additional limitations shall be deviated from the spirit of the present invention.

The invention claimed is:

1. A tubular motor assembly using a coreless motor structure, comprising a hollow steel tube body, a motor main body being internally provided in the steel tube body, wherein the motor main body is a coreless motor, and one end of the motor main body is inserted at one end of a battery circuit board housing; a control circuit board and/or a power supply battery which is connected to the motor main body and has a control circuit is provided within the battery circuit board housing through a battery circuit board positioning structure; the other end of the motor main body is connected to one end of a primary gear ring through a motor connecting seat, and a motor shaft of the motor main body is connected to a primary planetary gear assembly provided within the primary gear ring; the other end of the primary gear ring is connected to a secondary/tertiary gear ring having a secondary planetary gear assembly and a tertiary gear ring connected to each other through a brake outer sleeve; the primary planetary gear assembly is connected to the secondary planetary gear assembly through a brake structure located in the brake outer sleeve; the tertiary planetary gear assembly is connected to an output shaft which extends to the outer side of one end of the steel tube body; and, the other end of the steel tube body away from the output shaft is connected to a cover body through a limiting ring.

2. The tubular motor assembly using a coreless motor structure according to claim 1, wherein the battery circuit board positioning structure comprises a circuit board mounting region and a battery mounting region successively formed within the battery circuit board housing; a mounting opening which extends in the axial direction of the battery circuit board housing and is respectively communicated with the circuit board mounting region and the battery mounting region is formed on the outer circumferential side of the battery circuit board housing; the control circuit board is provided within the circuit board mounting region through a first positioning structure; and, the power supply battery is provided within the battery mounting region through a second positioning structure.

3. The tubular motor assembly using a coreless motor structure according to claim 2, wherein the battery circuit board housing comprises a cylindrical motor mounting drum; the motor mounting drum is coaxially connected to a battery circuit board mounting drum; the circuit board mounting region and the battery mounting region are successively formed within the battery circuit board mounting drum; the mounting opening is axially provided on the outer circumferential side of the battery circuit board mounting drum; one end of the motor main body is inserted into the motor mounting drum; the motor mounting drum and the battery circuit board mounting drum are separated from each other through a closure plate; a number of through holes for allowing terminals at one end of the motor main body to be inserted therein are formed on the closure plate; the terminals of the motor main body are connected to the control circuit board, respectively; mounting plates which go beyond the mounting opening and extend in the axial direction of the battery circuit board mounting drum are provided on two sides of the mounting opening, respectively; the mounting plates are parallel to each other; and, one end of each of the mounting plates is connected to the closure plate, while the other end thereof extends to an end of the battery circuit board mounting drum.

4. The tubular motor assembly using a coreless motor structure according to claim 1, wherein the brake structure comprises a brake mandrel which is provided within the brake outer sleeve through a circumferential positioning structure; a cylindrical brake drum is provided at one end of the brake mandrel, and a brake torsion spring is sleeved on the brake drum; a brake driving member and a brake driven member arranged coaxially are internally provided in the brake outer sleeve; the brake driving member is connected to an output end of the primary planetary gear assembly, and the brake driven member is connected to an input end of the secondary planetary gear assembly; the brake driving member is provided with two driving jaws, and one end of the brake driven member close to the brake driving member passes through the brake mandrel and is provided with two driven jaws; the driving jaws and the driven jaws are staggered one by one, and any one of the driving jaws is located on one side of any one of the driven jaws; and, a brake control assembly, which enables the brake torsion spring to expand in the circumferential direction and the brake driven member to rotate synchronously with the brake driving member in the same direction when the brake driving member rotates in the circumferential direction or enables the brake torsion spring to contract in the circumferential direction and the brake driven member to stop in the circumferential direction when the brake driven member rotates in the circumferential direction, is provided between the driving jaws and the driven jaws.

5. The tubular motor assembly using a coreless motor structure according to claim 4, wherein the brake control structure comprises bent legs which are formed at two ends of the brake torsion springs and bent outward in the radial direction; any one of the two driven jaws of the brake driven member is located between the two bent legs, and any one of the two bent legs is located between the driven jaws and the driving jaws; steps which extend outward in the widthwise direction of the driven jaws and are resisted against one side of the driving jaws are provided on two sides of one end of each of the driven jaws close to the brake driven member; and, gas for allowing the bent legs to extend therein are formed between the outer side of ends of the driven jaws away from the steps and the driving jaws.

6. The tubular motor assembly using a coreless motor structure according to claim 5, wherein the distance between the two bent legs of the brake torsion spring in the center line direction of the brake torsion spring is greater than the width of ends of the driven jaws away from the steps.

7. The tubular motor assembly using a coreless motor structure according to claim 4, wherein the brake mandrel comprises a mandrel ring body coaxially connected to the brake drum; the mandrel ring body and the brake drum are of an integral structure, and the inner circumferential side of the mandrel ring body is communicated with the inner circumferential side of the brake drum to form a mandrel passage; the circumferential positioning structure comprises a number of positioning slots formed on the inner circumferential side of one end of the brake outer sleeve; the positioning slots are arranged in the circumferential direction at uniform intervals and extend in the axial direction of the brake outer sleeve; a number of positioning lugs in one-to-one correspondence to the positioning slots are provided on the outer circumferential side of the mandrel ring body; and, the positioning lugs are clamped into the positioning slots, respectively.

8. The tubular motor assembly using a coreless motor structure according to claim 1, wherein the motor main body comprises a motor shell; a carbon brush set connected to a control circuit is provided at one end of the motor shell; a rotor carrier with the motor shaft is rotatably provided on the carbon brush set, and a coreless coil is provided on the motor shaft; a permanent magnet located on the inner circumferential side of the coreless coil is provided within the motor shell; and, the motor shaft passes through the permanent magnet and extends to the outer side of the motor shell.

9. The tubular motor assembly using a coreless motor structure according to claim 4, wherein the brake driving member comprises a driving mandrel which is coaxially and rotatably provided on the inner circumferential side of one end of the brake outer sleeve through a first rotating bearing; a driving member connecting hole is formed at one end of the driving mandrel, while the other end thereof is coaxially connected to a driving ring body; the driving jaws are correspondingly provided on the outer circumferential side of the driving ring body, respectively; and, one end of the driving ring body away from the driving mandrel is coaxially connected to a rotating drum.

10. The tubular motor assembly using a coreless motor structure according to claim 9, wherein the brake driven member comprises a driven mandrel which is coaxially and rotatably provided on the inner circumferential side of one end of the brake outer sleeve away from the driving mandrel through a second rotating bearing; a driven member connecting hole is formed at one end of the driven mandrel, while the other end thereof passes through the mandrel passage and is coaxially connected to a driven drum; the driven jaws are correspondingly provided on the outer circumferential side of one end of the driven drum, respectively; a rotating hole for allowing the rotating drum to be inserted therein is provided at one end of the driven drum, while a limiting ring body is provided at the other end thereof; and, an annular limiting step resisted against the limiting ring body is provided on the inner circumferential side of the brake drum.

\* \* \* \* \*